US012603696B2

(12) United States Patent
Sakamoto et al.

(10) Patent No.: US 12,603,696 B2
(45) Date of Patent: Apr. 14, 2026

(54) WIRELESS COMMUNICATION TECHNIQUE OF REDUCING INFLUENCE OF AN INTERFERENCE SIGNAL ON A RADIO SIGNAL

(71) Applicant: NTT, Inc., Tokyo (JP)

(72) Inventors: Kazumitsu Sakamoto, Musashino (JP); Yosuke Fujino, Musashino (JP); Daisuke Goto, Musashino (JP); Yasuyoshi Kojima, Musashino (JP); Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 358 days.

(21) Appl. No.: 18/268,579

(22) PCT Filed: Dec. 24, 2020

(86) PCT No.: PCT/JP2020/048446
§ 371 (c)(1),
(2) Date: Jun. 20, 2023

(87) PCT Pub. No.: WO2022/137428
PCT Pub. Date: Jun. 30, 2022

(65) Prior Publication Data
US 2024/0048226 A1 Feb. 8, 2024

(51) Int. Cl.
*H04B 7/185* (2006.01)
*G16Y 10/75* (2020.01)
*G16Y 40/10* (2020.01)

(52) U.S. Cl.
CPC .......... *H04B 7/18513* (2013.01); *G16Y 10/75* (2020.01); *G16Y 40/10* (2020.01);
(Continued)

(58) Field of Classification Search
None
See application file for complete search history.

(56) References Cited

U.S. PATENT DOCUMENTS 10,023,297 B1 * 7/2018 Beckman ................. G08G 5/57
2002/0077099 A1 * 6/2002 LaPrade ............. H04B 7/18578
455/430

(Continued)

OTHER PUBLICATIONS

Cheng, Yao et al., "Interference Suppression and Electronic Tracking Using Antenna Arrays at Satellite Ground Stations", WSA 2013; 17th International ITG Workshop on Smart Antennas, ISBN: 978-3-8007-3466-5, p. 7, Mar. 2013 (Year: 2013).*

(Continued)

*Primary Examiner* — Jason D Cardone

(57) ABSTRACT

The receiving apparatus includes a signal receiver, a second signal reception processor, a first signal reception processor, and a controller. The signal receiver receives the second signal indicating the reception time and the waveform data indicating the waveform of the first signal received from the transmission apparatus by each of the plurality of receiving antennas of the relay apparatus. The second signal reception processor performs reception processing of the second signal to acquire waveform data. The first signal reception processor performs reception processing of the first signal indicated by the waveform data to acquire data set to the first signal by the transmission apparatus. The controller calculates a generation time and a generation position of the interference signal with respect to the first signal on the basis of the observation result of the radio signal in the observation apparatus. The controller instructs the first signal reception processor to perform, in the reception processing, an operation of suppressing an interference signal arriving at the relay apparatus from a generation position at the generation time on the first signal at the reception time corresponding to the generation time.

14 Claims, 8 Drawing Sheets

(52) U.S. Cl.
CPC ..... *H04B 7/18517* (2013.01); *H04B 7/18519* (2013.01); *H04B 7/1858* (2013.01)

(56) References Cited

U.S. PATENT DOCUMENTS

| | | | | |
|---|---|---|---|---|
| 2009/0161797 A1* | 6/2009 | Cowles | .................... | G08G 3/02 |
| | | | | 375/324 |
| 2010/0203884 A1* | 8/2010 | Zheng | ................ | H04B 7/18513 |
| | | | | 455/427 |
| 2015/0162976 A1* | 6/2015 | Gobara | ............. | H04B 7/18513 |
| | | | | 370/316 |
| 2019/0288378 A1* | 9/2019 | DiFonzo | ............. | H01Q 25/008 |
| 2020/0358537 A1* | 11/2020 | Shim | ................... | H04L 25/0202 |
| 2020/0374976 A1* | 11/2020 | Dutta | ................... | H04W 24/10 |
| 2021/0226694 A1* | 7/2021 | Cherrette | ............ | H04B 7/1858 |
| 2023/0052173 A1* | 2/2023 | Nishio | ................. | H04W 52/34 |
| 2023/0251370 A1* | 8/2023 | Kalantari | ............... | G01S 7/006 |
| | | | | 342/42 |

OTHER PUBLICATIONS

Mohamed Lassaad Ammari et al., Low Complexity ZF and MMSE Detectors for the Uplink MU-MIMO Systems With a Time-Varying Number of Active Users, IEEE Transactions on Vehicular Technology, vol. 66, No. 7, Jul. 2017, pp. 6586-6590.

* cited by examiner

WIRELESS COMMUNICATION TECHNIQUE OF REDUCING INFLUENCE OF AN INTERFERENCE SIGNAL ON A RADIO SIGNAL

CROSS-REFERENCE TO RELATED APPLICATIONS

This application is a 371 National Stage of International Application No. PCT/JP2020/048446, filed on Dec. 24, 2020. The entire disclosure of the above application is incorporated herein by reference.

TECHNICAL FIELD

The present invention relates to a wireless communication system, a receiving apparatus, a control apparatus, a wireless communication method, a control method and a program.

BACKGROUND ART

With the development of Internet of Things (IoT) technology, installing IoT terminals including various sensors at various places on the earth has been studied. Moreover, it is also supposed that IoT is used to collect data of a place where it is difficult to install a base station (e.g., buoys or ships on the sea, and mountainous areas). Meanwhile, there is a technology in which an unmanned aerial vehicle (UAV), a geostationary satellite, or the like wirelessly communicates with a communication apparatus on the ground.

Moreover, in recent years, a satellite IoT platform has been studied. In a satellite IoT platform, a relay apparatus mounted on a mobile body such as an artificial satellite collects data from IoT terminals installed on the ground or on the sea. In a case where a low orbit satellite collects data from a terminal (which will be hereinafter referred to as a "satellite IoT terminal") that uses a satellite IoT platform, the satellite IoT terminal performs uplink transmission of data as a desired signal to the low orbit satellite when the low orbit satellite passes through the sky.

Here, a desired signal transmitted from a satellite IoT terminal to the low orbit satellite is sometimes interfered by an interference signal transmitted from a terminal (which will be hereinafter referred to as a "ground IoT terminal") that uses a ground IoT platform. In the ground IoT platform, a non-moving relay apparatus may collect data from an IoT terminal installed on the ground.

In order for the low orbit satellite to receive a weak desired signal transmitted from the IoT terminal on the ground toward the low orbit satellite, it is effective that the low orbit satellite controls the direction of a reception beam using a plurality of receiving antennas. For this reason, a zero forcing (ZF) method and a minimum mean square error (MMSE) method are known as methods for directing a reception beam toward an arrival direction of a desired signal while directing a null of the reception beam toward an arrival direction of an interference signal (refer to Non Patent Literature 1).

In the ZF method and the MMSE method, the component of the propagation channel in the desired signal and the component of the propagation channel in the interference signal are estimated using a known signal. A weighting coefficient of the ZF or the MMSE is derived on the basis of the estimated matrix of each propagation channel, thereby generating a reception beam.

CITATION LIST

Non Patent Literature

Non Patent Literature 1: M. L. Ammari and P. Fortier, "Low Complexity ZF and MMSE Detectors for the Uplink MU-MIMO Systems With a Time-Varying Number of Active Users", IEEE Transactions on Vehicular Technology, vol. 66, no. 7, pp. 6586-6590, July 2017.

SUMMARY OF INVENTION

Technical Problem

However, in the satellite IoT platform, since interference signals from an enormous number of ground IoT terminals arrive at the low orbit satellite, it is difficult to estimate the component of the propagation channel in the interference signal. Moreover, the signal sequence and the arrival timing of the interference signal transmitted from the ground IoT terminal are unknown. Accordingly, it is difficult to form the reception beam of the relay apparatus with high accuracy and constantly direct the null toward the generation source of the interference signal.

In view of the above circumstances, an object of the present invention is to provide a wireless communication system, a receiving apparatus, a control apparatus, a wireless communication method, a control method and a program capable of reducing an influence of an interference signal on a radio signal received by a relay apparatus.

Solution to Problem

An aspect of the present invention is a wireless communication system including a transmission apparatus, a relay apparatus, and a receiving apparatus, in which the relay apparatus includes: a first signal receiver that receives a radio first signal transmitted from the transmission apparatus by a plurality of receiving antennas; a reception waveform recorder that generates waveform data indicating a waveform of the first signal received by each of the plurality of receiving antennas; and a second signal transmitter that transmits the waveform data and a second signal indicating a reception time of the first signal to the receiving apparatus, and the receiving apparatus includes: a second signal receiver that receives the second signal transmitted from the relay apparatus; a second signal reception processor that performs reception processing of the second signal received by the second signal receiver to acquire the waveform data; a first signal reception processor that performs reception processing of the first signal indicated by the waveform data acquired by the second signal reception processor to acquire data set to the first signal by the transmission apparatus; and a controller that calculates a generation time and a generation position of an interference signal with respect to the first signal on the basis of an observation result of a radio signal in an observation apparatus, and instructs the first signal reception processor to perform, in the reception processing, an operation of suppressing an interference signal arriving at the relay apparatus from the generation position at the generation time on the first signal at the reception time corresponding to the generation time.

An aspect of the present invention is a receiving apparatus including: a signal receiver that receives a second signal indicating waveform data indicating a waveform of a first signal received from a transmission apparatus by each of a plurality of receiving antennas of a relay apparatus and a reception time of the first signal in the relay apparatus; a second signal reception processor that performs reception processing of the second signal received by the signal receiver to acquire the waveform data; a first signal reception processor that performs reception processing of the first signal indicated by the waveform data acquired by the second signal reception processor to acquire data set to the first signal by the transmission apparatus; and a controller that calculates a generation time and a generation position of an interference signal with respect to the first signal on the basis of an observation result of a radio signal in an observation apparatus, and instructs the first signal reception processor to perform, in the reception processing, an operation of suppressing an interference signal arriving at the relay apparatus from the generation position at the generation time on the first signal at the reception time corresponding to the generation time.

An aspect of the present invention is a control apparatus including: a calculator that calculates a generation time and a generation position of an interference signal with respect to a first signal transmitted by a transmission apparatus on the basis of an observation result of a radio signal in an observation apparatus; and an instructor that receives a second signal indicating waveform data indicating a waveform of the first signal received from the transmission apparatus by each of a plurality of receiving antennas of a relay apparatus and a reception time of the first signal in the relay apparatus, performs reception processing of the received second signal to acquire the waveform data, and instructs a receiving apparatus that performs reception processing of the first signal indicated by the acquired waveform data to acquire data set to the first signal by the transmission apparatus to perform, in the reception processing, an operation of suppressing an interference signal arriving at the relay apparatus from the generation position at the generation time on the first signal at the reception time corresponding to the generation time.

An aspect of the present invention is a wireless communication method in a wireless communication system including a transmission apparatus, a relay apparatus, and a receiving apparatus, the method including: a first signal reception step in which the relay apparatus receives a radio first signal transmitted from the transmission apparatus by a plurality of receiving antennas; a reception waveform recording step in which the relay apparatus generates waveform data indicating a waveform of the first signal received by each of the plurality of receiving antennas; a second signal transmission step in which the relay apparatus transmits the waveform data and a second signal indicating a reception time of the first signal to the receiving apparatus; a second signal reception step in which the receiving apparatus receives the second signal transmitted from the relay apparatus; a second signal reception processing step in which the receiving apparatus performs reception processing of the second signal received in the second signal reception step to acquire the waveform data; a first signal reception processing step in which the receiving apparatus performs reception processing of the first signal indicated by the waveform data acquired in the second signal reception processing step to acquire data set to the first signal by the transmission apparatus; and a control step in which the receiving apparatus calculates a generation time and a generation position of an interference signal with respect to the first signal on the basis of an observation result of a radio signal in an observation apparatus, and gives an instruction to perform, in the reception processing, an operation of suppressing an interference signal arriving at the relay apparatus from the generation position at the generation time on the first signal at the reception time corresponding to the generation time.

An aspect of the present invention is a wireless communication method including: a signal reception step of receiving a second signal indicating waveform data indicating a waveform of a first signal received from a transmission apparatus by each of a plurality of receiving antennas of a relay apparatus and a reception time of the first signal in the relay apparatus; a second signal reception processing step of performing reception processing of the second signal received in the signal reception step to acquire the waveform data; a first signal reception processing step of performing reception processing of the first signal indicated by the waveform data acquired in the second signal reception processing step to acquire data set to the first signal by the transmission apparatus; and a control step of calculating a generation time and a generation position of an interference signal with respect to the first signal on the basis of an observation result of a radio signal in an observation apparatus and giving an instruction to perform, in the reception processing, an operation of suppressing an interference signal arriving at the relay apparatus from the generation position at the generation time on the first signal at the reception time corresponding to the generation time.

An aspect of the present invention is a control method including: a calculation step of calculating a generation time and a generation position of an interference signal with respect to a first signal transmitted by a transmission apparatus on the basis of an observation result of a radio signal in an observation apparatus; and an instruction step of receiving a second signal indicating waveform data indicating a waveform of a first signal received from the transmission apparatus by each of a plurality of receiving antennas of a relay apparatus and a reception time of the first signal in the relay apparatus, performing reception processing of the received second signal to acquire the waveform data, and instructing a receiving apparatus that performs reception processing of the first signal indicated by the acquired waveform data to acquire data set to the first signal by the transmission apparatus to perform, in the reception processing, an operation of suppressing an interference signal arriving at the relay apparatus from the generation position at the generation time on the first signal at the reception time corresponding to the generation time.

An aspect of the present invention is a program for causing a computer to function as the above-described control apparatus.

Advantageous Effects of Invention

According to the present invention, it is possible to reduce an influence of an interference signal on a radio signal received by a relay apparatus.

DESCRIPTION OF EMBODIMENTS

The following description will explain embodiments of the present invention in detail with reference to the drawings.

First Embodiment

Figure 1:
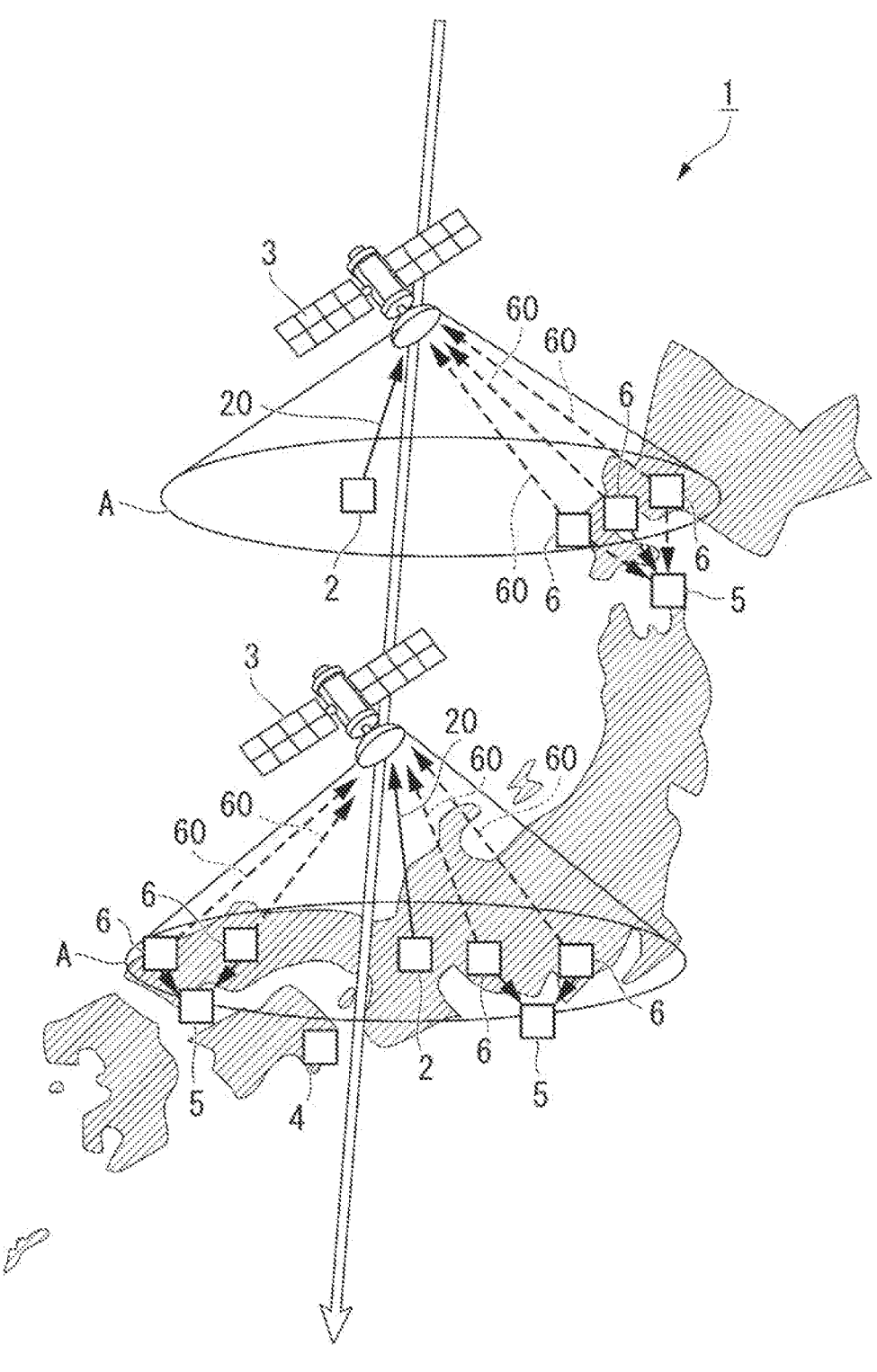
FIG. 1 is a diagram for explaining a wireless communication system according to a first embodiment of the present invention.

FIG. 1 is a diagram for explaining a wireless communication system 1 according to the first embodiment of the present invention. The wireless communication system 1 includes a terminal station 2, a mobile relay station 3, a base station 4, and an observation apparatus 5. In the wireless communication system 1, the number of each of terminal stations 2, mobile relay stations 3, base stations 4, and observation apparatuses 5 is arbitrary. Note that it is supposed that the number of the terminal stations 2 is large. The mobile relay station 3 moves through the sky above the earth. The terminal station 2, the base station 4, and the observation apparatus 5 are installed on the earth. The earth includes the ground and the sea.

Hereinafter, a desired signal transmitted from the terminal station 2 to the mobile relay station 3 using a radio signal is referred to as a "terminal uplink signal". A radio signal transmitted from the mobile relay station 3 to the base station 4 is referred to as a "base station downlink signal".

The terminal station 2 is, for example, a satellite IoT terminal. The terminal station 2 collects data such as environmental data detected by a sensor. The terminal station 2 transmits a terminal uplink signal including the collected data to the mobile relay station 3. The terminal station 2 transmits a terminal uplink signal 20 as a desired signal toward the mobile relay station 3 moving through the sky by a wireless mode used in the satellite IoT platform.

The mobile relay station 3 is an example of a relay apparatus in which a communicable area moves as time passes. The mobile relay station 3 is mounted on a mobile body to move through the sky. The mobile relay station 3 is provided in, for example, a low earth orbit (LEO) satellite. The mobile relay station 3 travels around the earth along a predetermined orbit. The altitude of the LEO satellite is 2000 km or less, and the LEO satellite travels through the sky around the earth in approximately 1.5 hours. The mobile relay station 3 receives the terminal uplink signal 20 from each terminal station 2 while moving through the sky above the earth.

The mobile relay station 3 accumulates data received from the terminal station 2 as the terminal uplink signal 20. The mobile relay station 3 transmits the accumulated data to the base station 4 at a timing at which communication with the base station 4 is possible. The mobile relay station 3 transmits the accumulated data to the base station 4 using a base station downlink signal.

The mobile relay station 3 includes an antenna to be used for wireless communication with the terminal station 2 and an antenna to be used for wireless communication with the base station 4. Therefore, the mobile relay station 3 can execute wireless communication related to the terminal station 2 and wireless communication related to the base station 4 in parallel. The mobile relay station 3 executes, for example, multiple input multiple output (MIMO) communication.

It is conceivable to use a relay station mounted on a geostationary satellite, or an unmanned aerial vehicle such as a drone or a high altitude platform station (HAPS) as the mobile relay station. However, in the case of a relay station mounted on a geostationary satellite, although the coverage area (footprint) on the ground is large, the link budget for an IoT terminal installed on the ground is extremely small due to the high altitude. On the other hand, in the case of a relay station mounted on a drone or a HAPS, although the link budget is high, the coverage area is small. Furthermore, the drone requires a battery, and the HAPS requires a solar panel. In the present embodiment, the mobile relay station 3 is mounted on an LEO satellite. Thus, in addition to the link budget remaining within limits, the LEO satellites have no air resistance and low fuel consumption to travel around outside the atmosphere. Moreover, the footprint is also larger than that of a case where a relay station is mounted on a drone or a HAPS.

However, since the mobile relay station 3 mounted on the LEO satellite performs communication while moving at high speed, the time during which each terminal station 2 or base station 4 can communicate with the mobile relay station 3 is limited. Specifically, when viewed on the ground, the mobile relay station 3 passes through the sky in about several minutes. Therefore, the mobile relay station 3 mounted on the LEO satellite has a smaller link budget than that of a case where the relay station is mounted on a drone or a HAPS. Therefore, the mobile relay station 3 receives the terminal uplink signal from the terminal station 2 in the coverage A at the current position during movement by a plurality of receiving antennas, and stores waveform data obtained by sampling the waveform of the terminal uplink signal received by each receiving antenna. Used for reception by a plurality of receiving antennas is, for example, multiple input multiple output (MIMO). Communication quality can be improved by a diversity effect and a beamforming effect of communication that uses a plurality of receiving antennas. Hereinafter, waveform data obtained by sampling a waveform of a terminal uplink signal received by a certain receiving antenna will be also referred to as waveform data of the receiving antenna.

The mobile relay station 3 wirelessly transmits the base station downlink signal, to which the stored waveform data is set, to the base station 4 at a timing when the base station 4 exists in the coverage. The base station 4 demodulates the base station downlink signal received from the mobile relay station 3 to obtain waveform data. The base station 4 performs signal processing and decoding on the terminal uplink signal indicated by the waveform data to obtain terminal transmission data that is data transmitted by the terminal station 2.

On the other hand, an interference station 6 exists on the earth. The interference station 6 is, for example, a ground IoT terminal. The interference station 6 transmits an interference signal 60. The interference signal 60 is a radio signal that interferes with the terminal uplink signal 20 transmitted from the terminal station 2. In a case where the interference station 6 is a ground IoT terminal, the interference signal 60 is a ground IoT signal. The interference station 6 transmits the interference signal 60 by a wireless mode used in the ground IoT platform.

In order to suppress interference caused by the interference signal 60, the base station 4 performs reception beam control. The base station 4 performs null steering for directing a null in the arrival direction of the interference signal 60 in the mobile relay station 3 by reception beam control. For this reception beam control, the base station 4 uses an observation result of the interference signal 60 by the observation apparatus 5. Observation apparatuses 5 are installed at many points on the earth. Each observation apparatus 5 observes the interference signal 60 transmitted by the interference station 6. The observation apparatus 5 notifies the base station 4 of the observation result.

The base station 4 analyzes the observation result received from the observation apparatus 5 and obtains information on the time and place at which the interference signal 60 has been generated. The number of the interference signals 60 received at a certain time by each of the observation apparatuses 5 at many points is smaller than the number of the interference signals 60 received by the mobile relay station 3, and the reception level of the interference signal 60 received by the observation apparatus 5 is also high. Thus, it is easy to detect the interference signal 60. The base station 4 calculates the arrival direction of the interference signal 60 arriving at the mobile relay station 3 using the information on the generation time and the signal generation place of the interference signal 60 estimated on the basis of the observation result, and the positional information of the LEO satellite at the time. When decoding the terminal uplink signal, the base station 4 performs null steering for directing a null toward the calculated arrival direction. As a result, the base station 4 suppresses the interference signal 60 when decoding the terminal uplink signal.

Details of the wireless communication system 1 will be described below.

Figure 2:
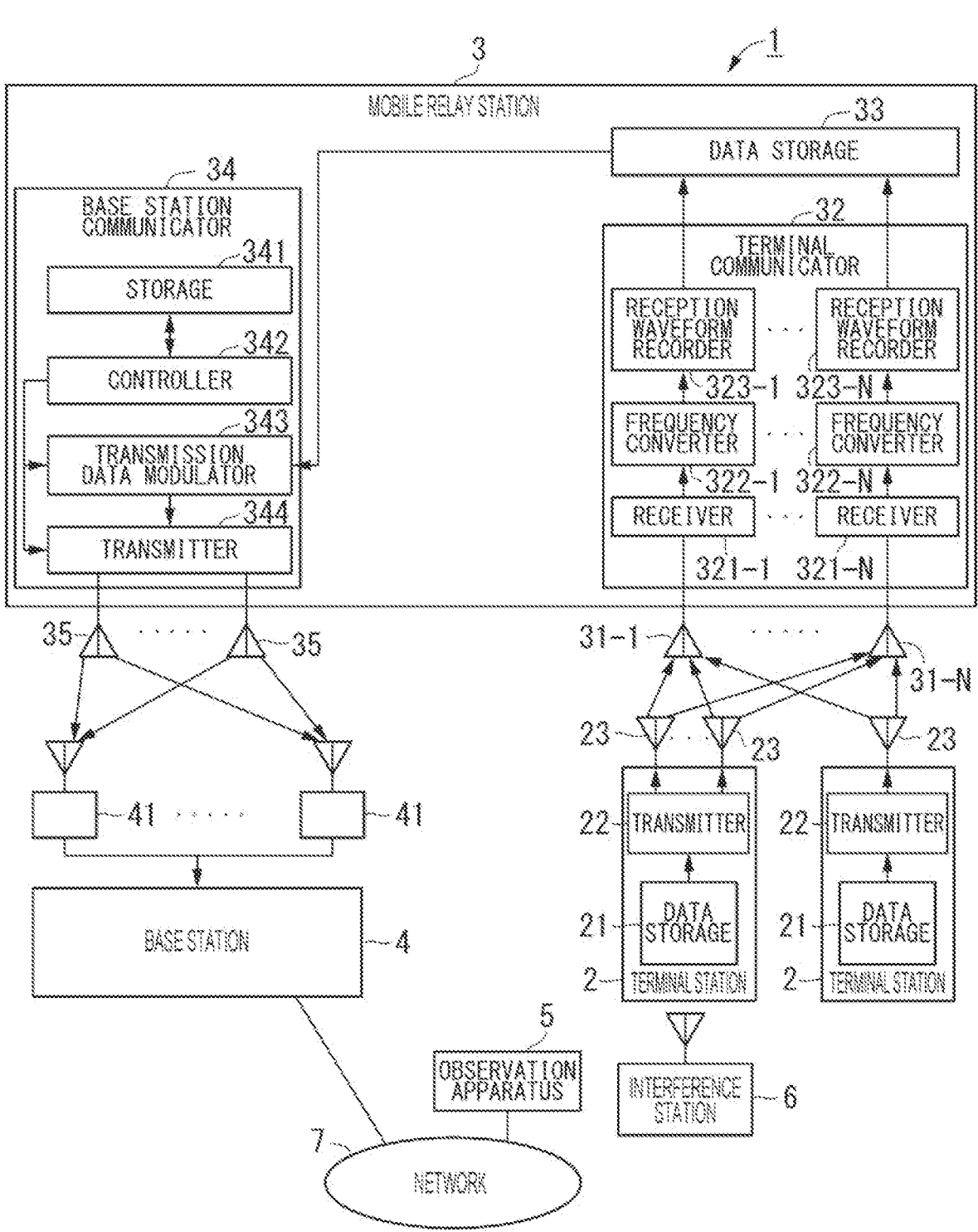
FIG. 2 is a configuration diagram of a wireless communication system according to the embodiment.

FIG. 2 is a configuration diagram of the wireless communication system 1. The wireless communication system 1 includes the terminal station 2, the mobile relay station 3, the base station 4, and the observation apparatus 5. The base station 4 and the observation apparatus 5 are connected via a network 7. The network 7 is, for example, a communication network on the ground.

The terminal station 2 includes a data storage 21, a transmitter 22, and one or a plurality of antennas 23. The data storage 21 stores sensor data and the like. The transmitter 22 reads sensor data from the data storage 21 as terminal transmission data. The transmitter 22 wirelessly transmits a terminal uplink signal, to which the read terminal transmission data is set, from the antenna 23. The transmitter 22 transmits a signal by low power wide area (LPWA), for example. The LPWA includes LoRaWAN (registered trademark), Sigfox (registered trademark), long term evolution for machines (LTE-M), narrow band (NB)-IoT, and the like, and an arbitrary wireless communication mode can be used. Moreover, the transmitter 22 may perform transmission with another terminal station 2 by time division multiplexing, orthogonal frequency division multiplexing (OFDM), or the like. The transmitter 22 determines a channel and a transmission timing to be used for transmission of a terminal uplink signal by its own station by a method determined in advance in a wireless communication mode to be used.

The mobile relay station 3 includes N (N is an integer of 2 or more) antennas 31, a terminal communicator 32, a data storage 33, a base station communicator 34, and M (M is an integer of 2 or more) antennas 35.

Each antenna 31 is a receiving antenna that receives a terminal uplink signal transmitted from the terminal station 2. The N antennas 31 are referred to as antennas 31-1 to 31-N.

The terminal communicator 32 includes N receivers 321, N frequency converters 322, and N reception waveform recorders 323. The N receivers 321 are referred to as receivers 321-1 to 321-N, the N frequency converters 322 are referred to as frequency converters 322-1 to 322-N, and the N reception waveform recorders 323 are referred to as reception waveform recorders 323-1 to 323-N.

A receiver 321-$n$ (n is an integer equal to or larger than 1 and equal to or smaller than N) receives a terminal uplink signal through an antenna 31-$n$. A frequency converter 322-$n$ performs frequency conversion on the terminal uplink received by the receiver 321-$n$ from a radio frequency (RF) signal into a baseband signal. For the frequency conversion, a quadrature demodulator or the like is used. A reception waveform recorder 323-$n$ samples the waveform of the terminal uplink signal subjected to the frequency conversion by the frequency converter 322-$n$, and generates waveform data indicating a value obtained by the sampling. The reception waveform recorder 323-$n$ writes the reception waveform information, in which the antenna identification information of the antenna 31-$n$, the reception time of the terminal uplink signal in the antenna 31-$n$, and the generated waveform data are set, in the data storage 33. The antenna identification information is information for specifying each antenna 31.

The data storage 33 stores the reception waveform information generated by the reception waveform recorders 323. The base station communicator 34 transmits a base station downlink signal to the base station 4 by MIMO. The base station communicator 34 includes a storage 341, a controller 342, a transmission data modulator 343, and a transmitter 344. The storage 341 stores a transmission start timing calculated in advance on the basis of the orbit information of the LEO satellite on which its own station is mounted and the position of the base station 4. Furthermore, the storage 341 stores in advance a weight for each transmission time of the base station downlink signal transmitted from each antenna 35. The weight for each transmission time is calculated on the basis of the orbit information of the LEO satellite and the position of each antenna station 41 provided in the base station 4. Note that a constant weight may be used regardless of the transmission time.

The controller 342 controls the transmission data modulator 343 and the transmitter 344 to transmit the base station downlink signal to the base station 4 at the transmission start timing stored in the storage 341. Furthermore, the controller 342 instructs the transmitter 344 on the weight for each transmission time read from the storage 341. The transmission data modulator 343 reads the reception waveform information stored in the data storage 33 as the transmission data. The transmission data modulator 343 converts the transmission data into a parallel signal and then modulates the parallel signal. The transmitter 344 weights the modulated parallel signal by a weight on which an instruction is given from the controller 342, and generates a base station downlink signal transmitted from each antenna 35. The transmitter 344 transmits the generated base station downlink signal from an antenna 35 by MIMO.

Each antenna 35 is a transmission antenna that wirelessly transmits a base station downlink signal. Moreover, the antenna 35 may receive a base station uplink signal wirelessly transmitted from the base station 4.

The base station 4 includes a plurality of antenna stations 41. Each antenna station 41 is disposed at a position away from the other antenna stations 41 so that an arrival angle difference of signals from each of the plurality of antennas 35 of the mobile relay station 3 becomes large. The configuration of the base station 4 will be described later with reference to FIG. 3.

The observation apparatus 5 observes an interference signal transmitted by the interference station 6. The observation apparatus 5 transmits observation result data indicating an observation result to the base station 4. The interference station 6 is a ground IoT terminal. The terminal station 2 transmits the terminal uplink signal toward the sky. On the other hand, the interference station 6 transmits a ground IoT signal that is an interference signal in a lateral direction, an upward direction, or the like.

Figure 3:
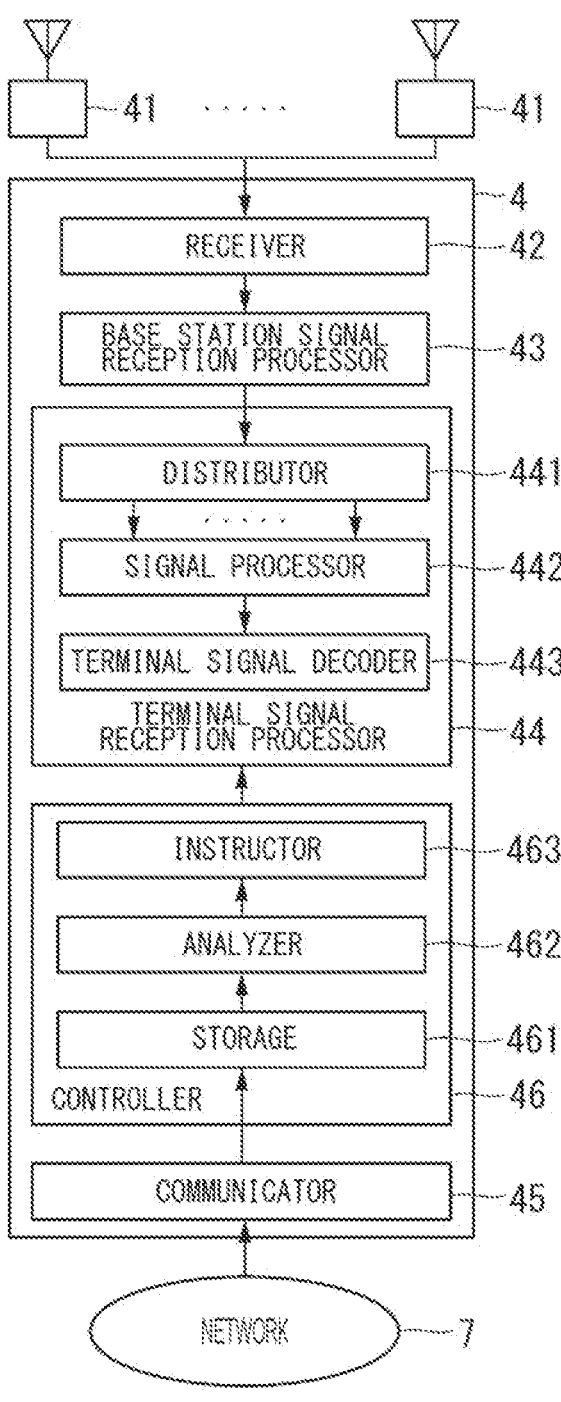
FIG. 3 is a configuration diagram of a base station according to the embodiment.

FIG. 3 is a diagram illustrating a configuration example of the base station 4. The base station 4 is also a control apparatus that performs reception beam control. The base station 4 includes the plurality of antenna stations 41, a receiver 42, a base station signal reception processor 43, a terminal signal reception processor 44, a communicator 45, and a controller 46.

Each antenna station 41 converts a base station downlink signal received from the mobile relay station 3 into an electrical signal and outputs the electrical signal to the receiver 42. The receiver 42 aggregates base station downlink signals received from the plurality of antenna stations 41. The receiver 42 stores a weight for each reception time with respect to a base station downlink signal received by each antenna station 41 on the basis of the orbit information of the LEO satellite and the position of each antenna station 41. The receiver 42 multiplies the base station downlink signal inputted from each antenna station 41 by a weight corresponding to the reception time of the base station downlink signal, and synthesizes the reception signals multiplied by the weight. Note that the same weight may be used regardless of the reception time. The base station signal reception processor 43 demodulates and decodes the synthesized reception signal to obtain reception waveform information. The base station signal reception processor 43 outputs the reception waveform information to the terminal signal reception processor 44.

The terminal signal reception processor 44 performs reception processing of the terminal uplink signal indicated by the reception waveform information. The terminal signal reception processor 44 performs reception processing by the wireless communication mode used for transmission by the terminal station 2 to acquire terminal transmission data. The terminal signal reception processor 44 includes a distributor 441, a signal processor 442, and a terminal signal decoder 443.

The distributor 441 reads the waveform data of each receiving antenna at the same reception time from the reception waveform information, and outputs the read waveform data to the signal processor 442. The signal processor 442 performs processing such as frame detection (terminal signal detection), Doppler shift compensation, and offline beam control. The frame detection is processing of detecting a section including a terminal transmission signal (terminal transmission frame) from waveform data. The signal processor 442 specifies a wireless communication mode used by the terminal station 2 for transmitting the terminal uplink signal on the basis of information specific to the wireless communication mode included in the reception signal indicated by the waveform data, and detects the terminal transmission frame according to the specified wireless communication mode. The offline beam control is processing in which the mobile relay station 3 transmits recorded waveform data to the base station 4 without performing reception beam control, and the base station 4 performs reception beam control as post-processing. In the reception beam control, the signal processor 442 multiplies and synthesizes the signals by weights for performing amplitude correction and phase correction so that the signals of the respective reception systems are intensified and synthesized with each other. Therefore, the signal processor 442 multiplies the reception signal obtained from the waveform data of each receiving antenna by a weight for performing amplitude correction and phase correction for intensifying and synthesizing the desired signals of the reception systems with each other while suppressing the interference signal. An instruction on the weight is given from the controller 46. The signal processor 442 adds and synthesizes the reception signals multiplied by the weights, and outputs a symbol obtained from the added and synthesized reception signals to the terminal signal decoder 443. The terminal signal decoder 443 decodes the symbol outputted from the signal processor 442 to obtain terminal transmission data transmitted from the terminal station 2. The terminal signal decoder 443 can also use a decoding mode with a large calculation load, such as successive interference cancellation (SIC).

The communicator 45 transmits and receives data via the network 7. The controller 46 performs null steering for interference cancellation. The controller 46 includes a storage 461, an analyzer 462, and an instructor 463. The storage 461 stores the orbit information of the LEO satellite and the observation result data received from each observation apparatus 5. The storage 461 may further store information on the position of each observation apparatus 5. The analyzer 462 is an example of a calculator that calculates the generation time and the generation position of the interference signal with respect to the terminal uplink signal transmitted by the terminal station 2 on the basis of the observation result of the radio signal in the observation apparatus 5. The analyzer 462 analyzes the observation result data received from each observation apparatus 5 and estimates the number of signals and the arrival direction of interference signals at each time. The analyzer 462 calculates the arrival direction of the interference signal at each time when arriving at the mobile relay station 3 on the basis of the number of signals and the arrival direction of the interference signal at each time and the positional information of the LEO satellite at each time. The analyzer 462 calculates a weight to be multiplied by the reception signal of each antenna 31 at each time on the basis of the calculation result. The calculated weight is a weight for directing a null toward an arrival direction of an interference signal to the mobile relay station 3. The instructor 463 instructs the terminal signal reception processor 44 on a weight at each time.

An operation of the wireless communication system 1 is now described.

Figure 4:
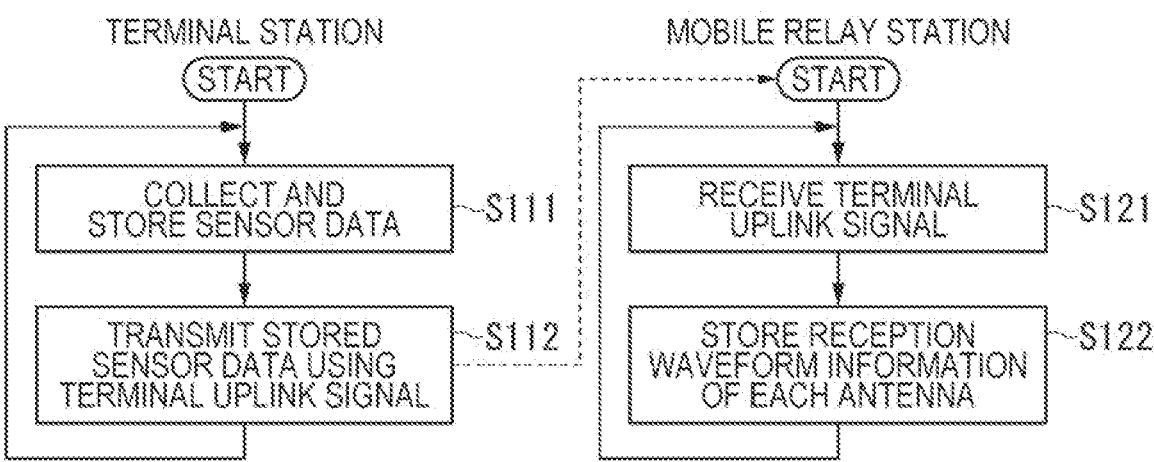
FIG. 4 is a flowchart illustrating processing of a wireless communication system according to the embodiment.

FIG. 4 is a flowchart illustrating processing of the wireless communication system 1 in a case where a terminal uplink signal is transmitted from the terminal station 2. The terminal station 2 acquires data detected by a sensor (not shown) provided outside or inside at any time, and writes the acquired data in the data storage 21 (step S111). The transmitter 22 reads sensor data from the data storage 21 as terminal transmission data. The transmitter 22 wirelessly transmits the terminal uplink signal, to which the terminal transmission data is set, from the antenna 23 at a transmission start timing obtained in advance on the basis of the orbit information of the LEO satellite equipped with the mobile relay station 3 (step S112). The terminal station 2 repeats the processing from step S111. Note that the terminal station 2 may perform transmission with another terminal station 2 by time division multiplexing, OFDM, MIMO, or the like.

The receivers 321-1 to 321-N of the mobile relay station 3 receive a terminal uplink signal transmitted from the terminal station 2 (step S121). Depending on the wireless communication mode of the transmission source terminal station 2, there are a case where a terminal uplink signal is received from only one terminal station 2 in a time division manner at the same frequency, and a case where terminal uplink signals are simultaneously received from a plurality of terminal stations 2 at the same frequency. The frequency converter 322-n performs frequency conversion on the terminal uplink received by the receiver 321-n from an RF signal to a baseband signal. The reception waveform recorder 323-n writes the reception waveform information, in which the waveform data representing the waveform of the terminal uplink signal subjected to the frequency conversion by the frequency converter 322-n, the reception time, and the antenna identification information of the antenna 31-n are associated with each other, in the data storage 33 (step S122). The mobile relay station 3 repeats the processing from step S121.

Figure 5:
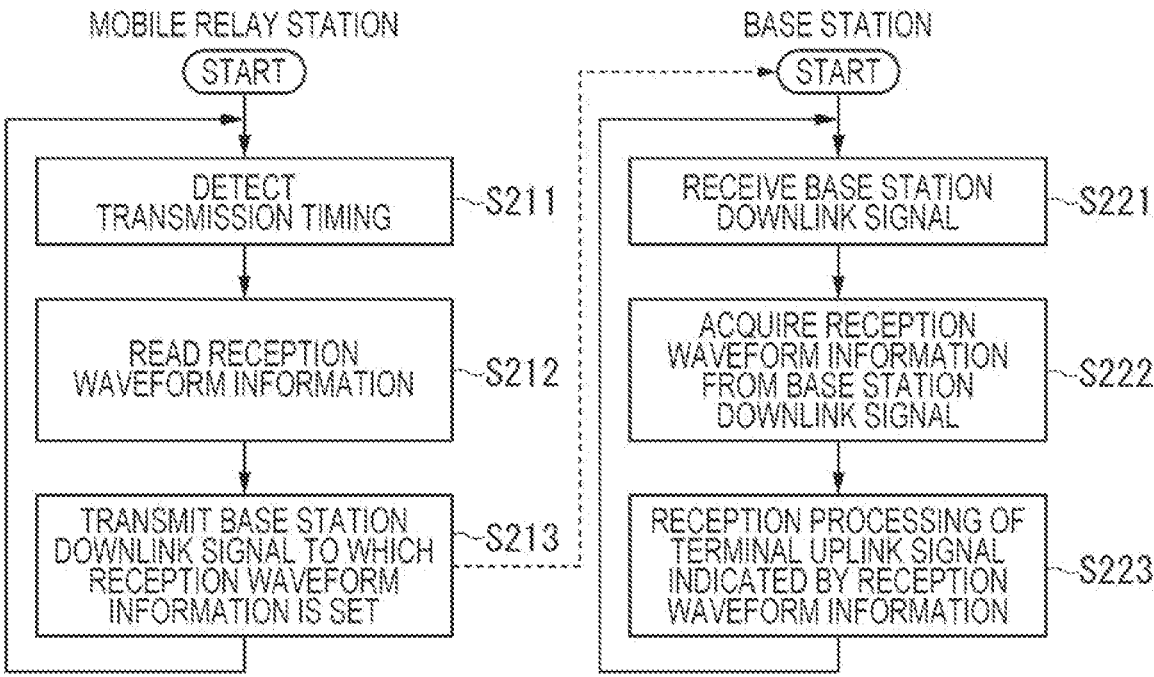
FIG. 5 is a flowchart illustrating processing of a wireless communication system according to the embodiment.

FIG. 5 is a flowchart illustrating processing of the wireless communication system 1 in a case where a base station downlink signal is transmitted from the mobile relay station 3. When detecting that it is the transmission start timing stored in the storage 341, the controller 342 included in the base station communicator 34 of the mobile relay station 3 instructs the transmission data modulator 343 and the transmitter 344 to transmit the reception waveform information (step S211).

The transmission data modulator 343 reads the reception waveform information from the data storage 33 as transmission data (step S212). Here, the reception waveform information read from the storage 341 by the transmission data modulator 343 is reception waveform information in which a reception time after the reception time set in the reception waveform information read last by the transmission data modulator 343 is set. The transmission data modulator 343 performs parallel conversion on the acquired transmission data and then modulates the transmission data.

The transmitter 344 weights the transmission data modulated by the transmission data modulator 343 by the weight on which an instruction is given from the controller 342, and generates a base station downlink signal that is a transmission signal transmitted from each antenna 35. The transmitter 344 transmits each generated base station downlink signal from the antenna 35 by MIMO (step S213). The mobile relay station 3 repeats the processing from step S211.

Each antenna station 41 of the base station 4 receives a base station downlink signal from the mobile relay station 3 (step S221). Each antenna station 41 outputs a reception signal obtained by converting the received base station downlink signal into an electrical signal to the receiver 42. The receiver 42 synchronizes the timings of the reception signals received from the respective antenna stations 41. The receiver 42 multiplies the reception signal received by each antenna station 41 by a weight and adds the reception signal. The base station signal reception processor 43 demodulates the added reception signal and decodes the demodulated reception signal. As a result, the base station signal reception processor 43 obtains the reception waveform information (step S222). The base station signal reception processor 43 outputs the reception waveform information to the terminal signal reception processor 44.

The terminal signal reception processor 44 performs reception processing of the terminal uplink signal indicated by the reception waveform information (step S223). Specifically, the distributor 441 reads waveform data having the same reception time from the reception waveform information. The distributor 441 outputs the read waveform data and the antenna identification information of the waveform data to the signal processor 442. The signal processor 442 performs frame detection (terminal signal detection), Doppler shift compensation, and offline beam control on each of the reception signals indicated by the waveform data outputted from the distributor 441. In the offline beam control, the signal processor 442 multiplies the reception signal by the weight on which an instruction is given by the instructor 463. The weight on which an instruction is given from the instructor 463 is a weight for suppressing an interference signal by null steering. The signal processor 442 adds and synthesizes the reception signals multiplied by the weights. With the addition and synthesis, the terminal uplink signal transmitted by the terminal station 2 is emphasized because of the correlation, but the influence of the randomly added noise is reduced. Therefore, the diversity effect can be obtained for the terminal uplink signal that the mobile relay station 3 simultaneously receives from only one terminal station 2. Moreover, terminal uplink signals simultaneously received by the mobile relay station 3 from a plurality of terminal stations 2 correspond to performing MIMO communication. The signal processor 442 outputs the symbol of the added and synthesized reception signal to the terminal signal decoder 443. The terminal signal decoder 443 decodes the symbol inputted from the signal processor 442 to obtain terminal transmission data transmitted from the terminal station 2. The base station 4 repeats the processing from step S221.

Figure 6:
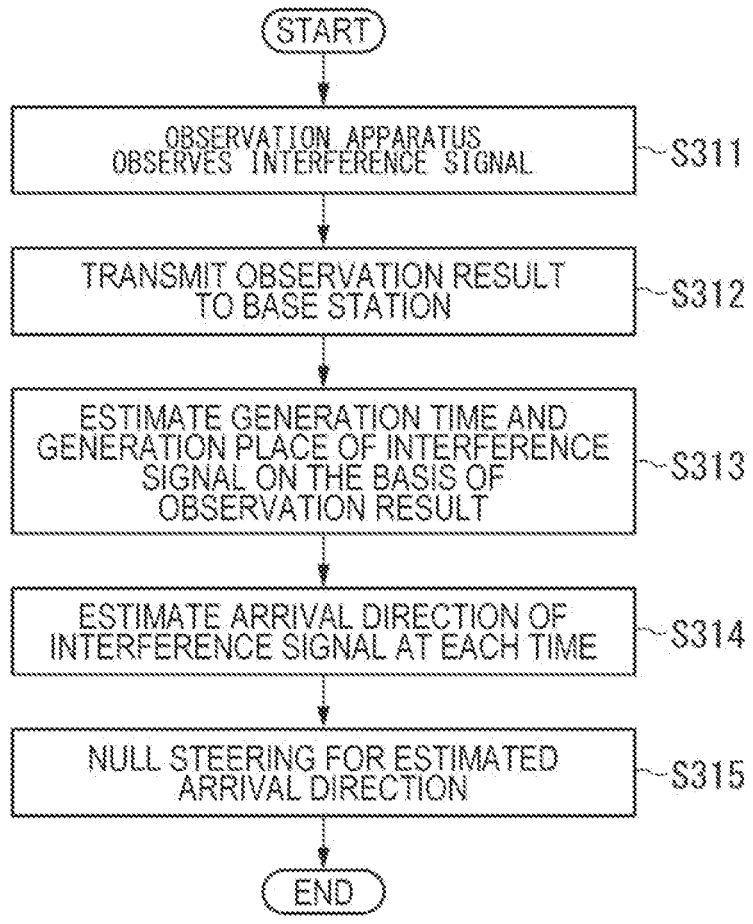
FIG. 6 is a flowchart illustrating processing of a wireless communication system according to the embodiment.

FIG. 6 is a flowchart illustrating processing of interference suppression control of the wireless communication system 1. The observation apparatus 5 observes the interference signal transmitted by the interference station 6 (step S311). In a case where the observation apparatus 5 is a waveform sampling apparatus, the observation apparatus 5 generates observation result data indicating the waveform of a radio signal received at each time. In a case where the observation apparatus 5 is a receiving apparatus of a ground IoT signal, the observation apparatus 5 generates observation result data indicating the level of the ground IoT signal received at each time. The observation apparatus 5 identifies the ground IoT signal by a preamble included in the radio signal. In a case where the observation apparatus 5 includes a plurality of antennas, the observation result data includes information on a reception level at each antenna.

The observation apparatus 5 transmits the generated observation result data to the base station 4 (step S312). The storage 461 of the base station 4 stores the observation result data received from the observation apparatus 5. The analyzer 462 analyzes the observation result indicated by the observation result data received from each observation apparatus 5, and calculates the estimated generation time and the generation place of the interference signal from the interference station 6 (step S313).

For example, the analyzer 462 estimates the signal generation place using the observation result in each of the plurality of observation apparatuses 5. An arbitrary existing technique is used for the estimation. As an example, there is estimation that uses three-point positioning. The analyzer 462 acquires the reception level of the same interference signal at each time from the observation result data of each of the plurality of observation apparatuses 5. The same interference signal can be specified on the basis of a preamble or the like included in the interference signal. The analyzer 462 calculates an approximate signal generation place of the interference signal at each time by three-point positioning on the basis of the positions of the observation apparatuses 5 and the relationship between the reception levels in the observation apparatuses 5.

Moreover, in a case where the observation apparatus 5 includes a plurality of receiving antennas, the analyzer 462 estimates the arrival direction of the interference signal in the observation apparatus 5 on the basis of the reception level of each receiving antenna at the same time indicated by the observation result data. An arbitrary conventional technique is used to calculate the estimation of the arrival direction. Furthermore, the analyzer 462 calculates an approximate signal generation place of the interference signal for each time by using the estimated arrival direction and the reception level indicated by the observation result. The calculated signal generation place is a relative position with respect to the observation apparatus 5. Therefore, the analyzer 462 uses the information on the position of the observation apparatus 5 to convert the calculated signal generation place from the relative position into information on the position in the coordinate system used in the entire wireless communication system 1.

The analyzer 462 estimates the number of signals and the arrival direction of the interference signals arriving at the mobile relay station 3 at each time on the basis of the information on the generation time and the signal generation place of the estimation of each interference signal calculated using the observation result data of the plurality of observation apparatuses 5 (step S314). The number of interference signals is obtained by counting the number of interference signals observed at many points on the ground. The analyzer 462 calculates the arrival direction of the interference signal arriving at the mobile relay station 3 on the basis of the information on the generation time and the signal generation place of the interference signals obtained at many points on the ground and the positional information of the LEO satellite at the time. For example, the analyzer 462 may calculate the arrival direction for a time when the number of interference signals from an area having a predetermined size is equal to or larger than a predetermined value. Note that the analyzer 462 obtains the positional information of the LEO satellite at each time from the orbit information of the LEO stored in the storage 461.

The analyzer 462 forms a highly accurate beam for interference rejection by using the estimation result of the arrival direction of the interference signal to the mobile relay station 3 at each time. That is, the analyzer 462 performs null steering for directing a null toward the arrival direction of the interference signal to the mobile relay station 3 (step S315). For example, the analyzer 462 uses the ZF method or the MMSE method to generate a weighting matrix for directing a null toward the arrival direction of the interference signal at each time t. The weighting matrix indicates a weight for a signal received by each antenna 31. The analyzer 462 outputs the weight of the antenna 31-$n$ at each time to the signal processor 442. The signal processor 442 multiplies the reception signal obtained from the waveform data of the antenna 31-$n$ at the reception time t by the weight of the antenna 31-$n$ at the time t when the signal is received from the analyzer 462. As a result, the interference signal included in the reception signal received by the mobile relay station 3 is suppressed.

According to the above-described embodiment, it is possible to reduce the influence of the interference signal on the terminal uplink signal received by the mobile relay station 3 by performing beam forming so as to direct a null toward the interference signal.

Second Embodiment

Although the frequency conversion of the terminal uplink signal is performed in the mobile relay station in the first embodiment, the frequency conversion may be performed in the base station. In a second embodiment, a wireless communication system that performs frequency conversion in a base station will be described focusing on a difference from the first embodiment described above.

Figure 7:
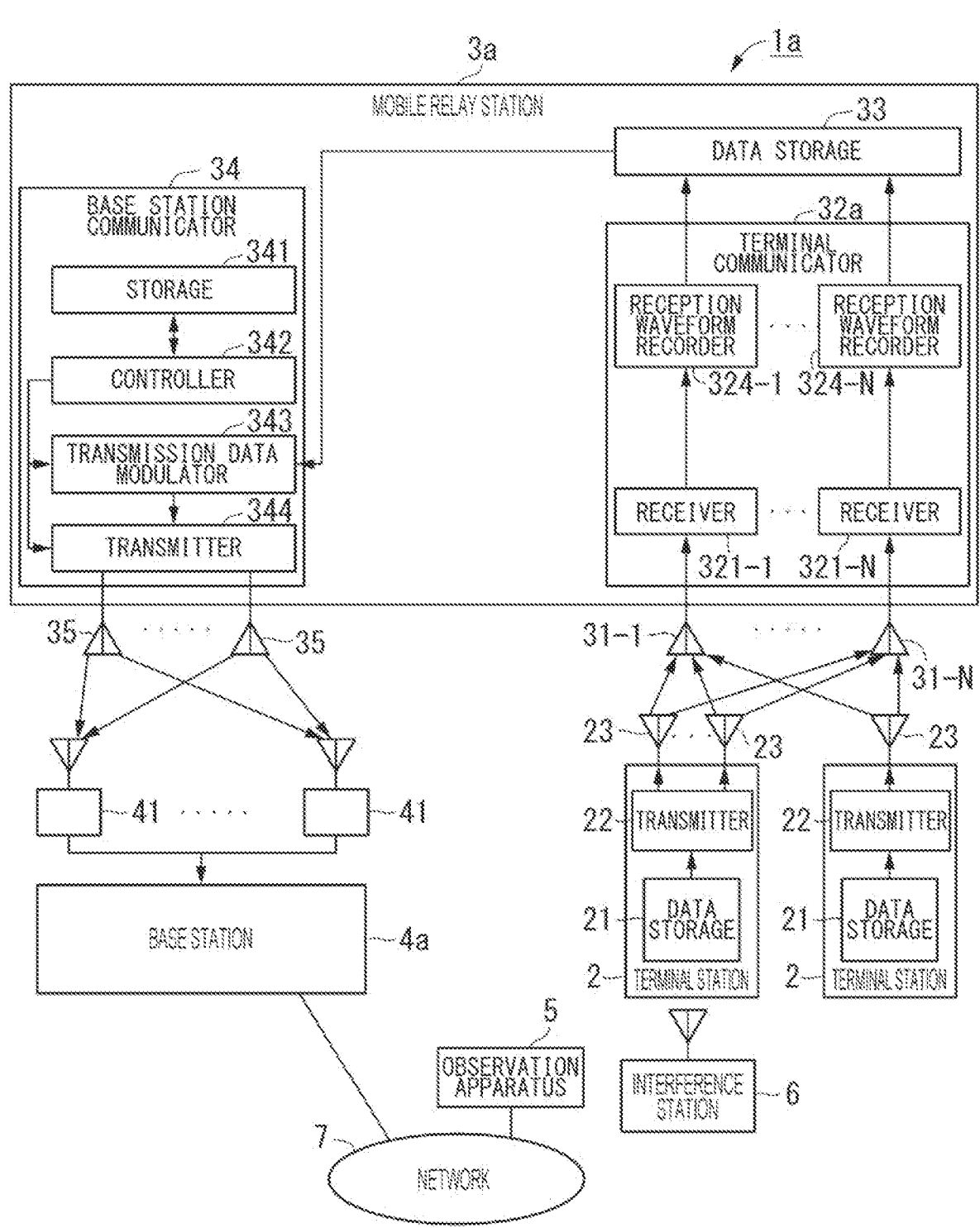
FIG. 7 is a configuration diagram of a wireless communication system according to a second embodiment.

FIG. 7 is a diagram illustrating a configuration of a wireless communication system 1$a$ according to the second embodiment. In FIG. 7, the same components as those of the wireless communication system 1 according to the first embodiment illustrated in FIG. 2 are denoted by the same reference numerals, and the description thereof will be omitted. The wireless communication system 1$a$ includes a terminal station 2, a mobile relay station 3$a$, and a base station 4$a$.

The mobile relay station 3$a$ illustrated in FIG. 7 is different from the mobile relay station 3 illustrated in FIG. 2 in that a terminal communicator 32$a$ is provided instead of the terminal communicator 32. The terminal communicator 32$a$ includes N receivers 321 and N reception waveform recorders 324. A reception waveform recorder 324 connected with a receiver 321-$n$ will be referred to as a reception waveform recorder 324-$n$. The reception waveform recorder 324-$n$ samples the reception waveform of the terminal uplink signal received by the receiver 321-$n$ as an RF signal, and generates waveform data indicating a value obtained by the sampling. The reception waveform recorder 324-$n$ writes the reception waveform information, in which the antenna identification information of the antenna 31-$n$, the reception time of the terminal uplink signal in the antenna 31-$n$, and the generated waveform data are set, to the data storage 33.

Figure 8:
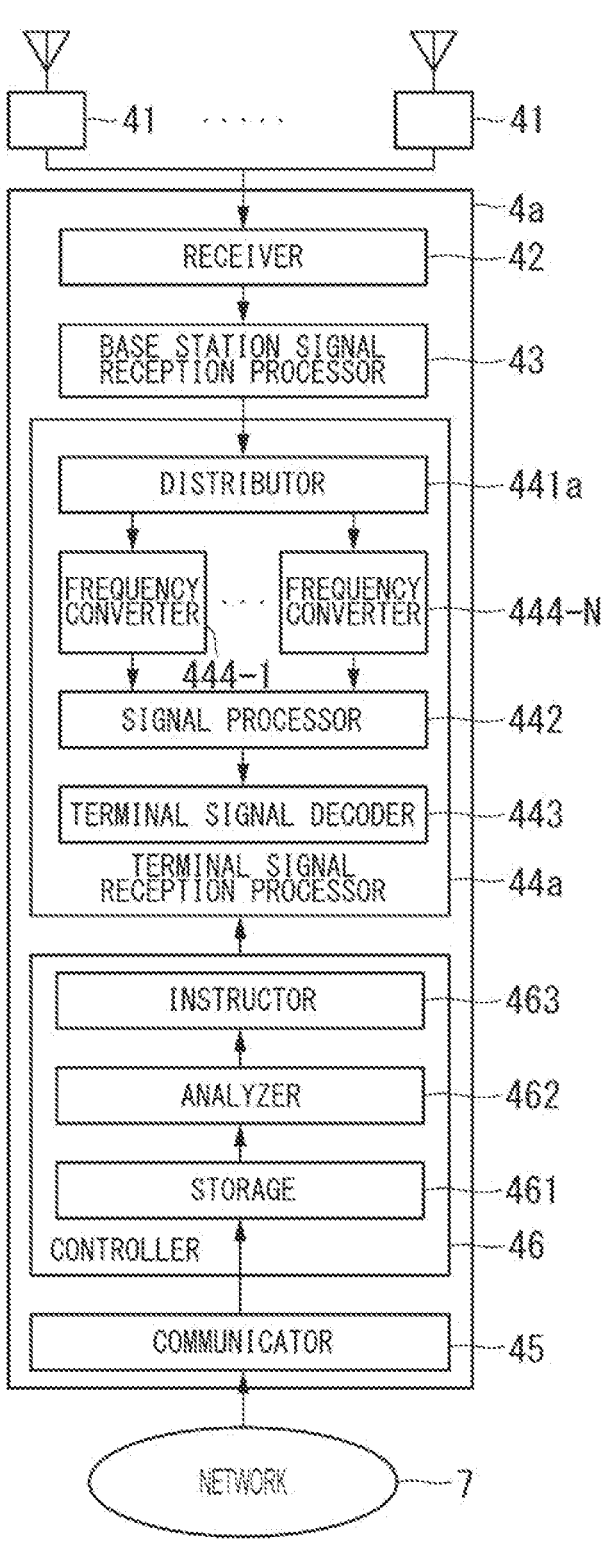
FIG. 8 is a configuration diagram of a base station according to the embodiment.

FIG. 8 is a diagram illustrating a configuration of the base station 4$a$. In FIG. 8, the same components as those of the base station 4 illustrated in FIG. 3 are denoted by the same reference numerals, and the description thereof will be omitted. The base station 4$a$ illustrated in FIG. 8 is different from the base station 4 illustrated in FIG. 3 in that a terminal signal reception processor 44$a$ is provided instead of the terminal signal reception processor 44. The terminal signal reception processor 44$a$ includes a distributor 441$a$, N frequency converters 444, a signal processor 442, and a terminal signal decoder 443. The N frequency converters 444 are respectively referred to as frequency converters 444-1 to 444-N.

The distributor 441$a$ reads the waveform data of the same reception time from the reception waveform information, and outputs the read waveform data to the frequency converters 444-1 to 444-N according to the antenna identification information associated with the waveform data. That is, the distributor 441$a$ outputs the waveform data associated with the antenna identification information of the antenna 31-$n$ to the frequency converter 444-$n$. The frequency converter 444-$n$ performs frequency conversion on a signal represented by the inputted waveform data from an RF signal to a baseband signal. For the frequency conversion, a quadrature demodulator or the like is used. Each of the frequency converters 444-1 to 444-N outputs a signal subjected to the frequency conversion to the signal processor 442.

The wireless communication system 1a of the second embodiment performs processing similar to the processing of the wireless communication system 1 of the first embodiment illustrated in FIGS. 4 to 6 except for the following points. That is, in step S122 in FIG. 4, the reception waveform recorder 324-n of the mobile relay station 3a writes, in the data storage 33, the reception waveform information in which the waveform data representing the waveform of the terminal uplink signal received by the receiver 321-n, the reception time, and the antenna identification information of the antenna 31-n are associated with each other. In step S223 in FIG. 5, the distributor 441a reads waveform data having the same reception time from the reception waveform information. The distributor 441a outputs the read waveform data to the frequency converters 444-1 to 444-N according to the antenna identification information associated with the waveform data. The frequency converter 444-n performs frequency conversion on the reception signal indicated by the waveform data from an RF signal to a baseband signal. The frequency converter 444-n outputs the reception signal subjected to the frequency conversion to the signal processor 442. Processing after the reception signal is inputted from each of the frequency converters 444-1 to 444-N to the signal processor 442 is similar to that in the first embodiment described above.

Figure 9:
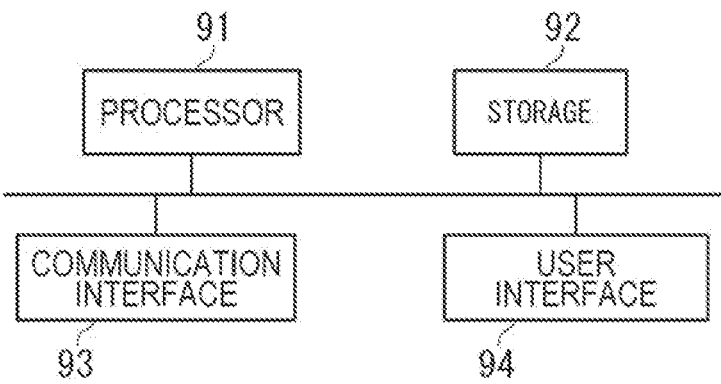
FIG. 9 is a hardware configuration diagram of a base station according to the first and second embodiments.

A hardware configuration example of the base station 4 or 4a will be described. FIG. 9 is a apparatus configuration diagram illustrating a hardware configuration example of the base station 4 or 4a. The base station 4 or 4a includes a processor 91, a storage 92, a communication interface 93, and a user interface 94.

The processor 91 is a central processing unit that performs operation and control. The processor 91 is, for example, a central processing unit (CPU). The storage 92 is a storage apparatus such as various memories or a hard disk. The processor 91 reads and executes the program from the storage 92, thereby implementing the controller 46. Some of the functions of the controller 46 may be implemented using hardware such as an application specific integrated circuit (ASIC), a programmable logic apparatus (PLD), or a field programmable gate array (FPGA). The storage 92 further includes a work area and the like to be used when the processor 91 executes various programs. The communication interface 93 is communicably connected with another apparatus. The communication interface 93 corresponds to the receiver 42, the base station signal reception processor 43, the terminal signal reception processors 44 and 44a, and the communicator 45. The user interface 94 is an input apparatus such as a keyboard, a pointing apparatus (a mouse, a tablet, etc.), a button, or a touch panel, or a display apparatus such as a display. Artificial operations are inputted through the user interface 94.

Note that a control apparatus that is an external apparatus connected with the base station 4 or 4a may include the communicator 45 and the controller 46 or a part of the functions of the controller 46. Although the mobile relay station 3 and the base station 4, and the mobile relay station 3a and the base station 4a perform communication by MIMO in the present embodiments described above, the present invention is not limited thereto. For example, the mobile relay station 3 or 3a may transmit a base station downlink signal to the base station 4 or 4a by one antenna 35 Similarly, the base station 4 or 4a may receive a base station downlink signal from the mobile relay station 3 or 3a by one antenna instead of the antenna station 41.

Although the case where the mobile object on which the mobile relay station is mounted is an LEO satellite has been described in the above embodiment, the mobile body may be another flying object that flies through the sky, such as a geostationary satellite, a drone, or a HAPS. Moreover, the above embodiments are also applicable to a fixed relay station that does not move, instead of the mobile relay station. In this case, information on the installation position of the relay station is used instead of the information on the position of the LEO satellite. Moreover, the above embodiments are also applicable to a case where one or both of the terminal station 2 and the interference station 6 move.

According to the above-described embodiments, a wireless communication system includes a transmission apparatus, a relay apparatus, and a receiving apparatus. For example, the transmission apparatus is the terminal station 2, the relay apparatus is the mobile relay station 3 or 3a, and the receiving apparatus is the base station 4 or 4a. The relay apparatus includes a first signal receiver, a reception waveform recorder, and a second signal transmitter. For example, the first signal receiver is the receiver 321 and the frequency converters 322-1 to 322-N, the reception waveform recorder is the reception waveform recorders 323 and 324, and the second signal transmitter is the base station communicator 34. The first signal receiver receives a radio first signal transmitted from the transmission apparatus by a plurality of receiving antennas. For example, the first signal is a terminal uplink signal. The reception waveform recorder generates waveform data indicating the waveform of the first signal received by each of the plurality of receiving antennas. The second signal transmitter transmits the waveform data and the second signal indicating the reception time of the first signal to the receiving apparatus. For example, the second signal is a base station downlink signal.

The receiving apparatus includes a second signal receiver, a second signal reception processor, a first signal reception processor, and a controller. For example, the second signal receiver is the receiver 42, the second signal reception processor is the base station signal reception processor 43, the first signal reception processor is the terminal signal reception processor 44 or 44a, and the controller is the controller 46. The second signal receiver receives the second signal transmitted from the relay apparatus. The second signal reception processor performs reception processing of the second signal received by the second signal receiver to acquire waveform data. The first signal reception processor performs reception processing of the first signal indicated by the waveform data acquired by the second signal reception processor to acquire data set to the first signal by the transmission apparatus. The controller calculates a generation time and a generation position of the interference signal with respect to the first signal on the basis of the observation result of the radio signal in the observation apparatus. The controller instructs the first signal reception processor to perform, in the reception processing, an operation of suppressing an interference signal arriving at the relay apparatus from a generation position at the generation time on the first signal at the reception time corresponding to the calculated generation time. Note that the control apparatus connected with the relay apparatus may include the controller.

The relay apparatus may be provided in the mobile body. In this case, the controller calculates the arrival direction of the interference signal with respect to the relay apparatus on the basis of the generation time and the generation position of the interference signal, and the position of the mobile body at the generation time. The controller instructs the first signal reception processor to perform, in the reception processing, an operation of suppressing an interference signal arriving at the relay apparatus from an arrival direction at the generation time on the first signal at the reception time corresponding to the calculated generation time.

For example, the operation on which an instruction is given by the controller is multiplication of a weight for the first signal received by each of the plurality of receiving antennas of the relay apparatus.

Although the embodiments of the present invention have been described in detail with reference to the drawings, specific configurations are not limited to the embodiments, and include design and the like within the scope of the present invention without departing from the gist thereof.

REFERENCE SIGNS LIST 1, 1a Wireless communication system
2 Terminal station
3, 3a Mobile relay station
4, 4a Base station
5 Observation apparatus
6 Interference station
7 Network
21 Data storage
22 Transmitter
23 Antenna
31-1 to 31-N Antenna
32, 32a Terminal communicator
33 Data storage
34 Base station communicator
35 Antenna
41 Antenna station
42 Receiver
43 Base station signal reception processor
44, 44a Terminal signal reception processor
45 Communicator
46 Controller
91 Processor
92 Storage
93 Communication interface
94 User interface
321-1 to 321-N Receiver
322-1 to 322-N Frequency converter
323-1 to 323-N, 324-1 to 324-N Reception waveform
    recorder
341 Storage
342 Controller
343 Transmission data modulator
344 Transmitter
441, 441a Distributor
442 Signal processor
443 Terminal signal decoder
444-1 to 444-N Frequency converter
461 Storage
462 Analyzer
463 Instructor

The invention claimed is:

1. A wireless communication system comprising a transmission apparatus, a relay apparatus, and a receiving apparatus,
    wherein
    the relay apparatus includes:
        a first signal receiver that receives a radio first signal transmitted from the transmission apparatus by a plurality of receiving antennas;
        a reception waveform recorder that generates waveform data indicating a waveform of the first signal received by each of the plurality of receiving antennas; and a second signal transmitter that transmits the waveform data and a second signal indicating a reception time of the first signal to the receiving apparatus, and
    the receiving apparatus includes:
        a second signal receiver that receives the second signal transmitted from the relay apparatus;
        a second signal reception processor that performs reception processing of the second signal received by the second signal receiver to acquire the waveform data;
        a first signal reception processor that performs reception processing of the first signal indicated by the waveform data acquired by the second signal reception processor to acquire data that is set to the first signal by the transmission apparatus; and
        a controller that calculates a generation time and a generation position of an interference signal with respect to the first signal on a basis of an observation result of a radio signal in at least one observation apparatus, and instructs the first signal reception processor to perform, in the reception processing, an operation of suppressing an interference signal arriving at the relay apparatus from the generation position at the generation time on the first signal at the reception time corresponding to the generation time.

2. The wireless communication system according to claim 1, wherein
    the relay apparatus is provided in a mobile body, and
    the controller calculates an arrival direction of an interference signal with respect to the relay apparatus on a basis of the generation time and the generation position of the interference signal and a position of the mobile body at the generation time, and instructs the first signal reception processor to perform, in the reception processing, an operation of suppressing an interference signal arriving at the relay apparatus from the arrival direction at the generation time on the first signal at the reception time corresponding to the generation time.

3. The wireless communication system according to claim 2, wherein the relay apparatus is provided in a flying object.

4. The wireless communication system according to claim 3, wherein
    the relay apparatus is provided in a low orbit satellite, and
    the transmission apparatus, the receiving apparatus, and the at least one observation apparatus are installed on an earth.

5. The wireless communication system according to claim 3, wherein the operation is multiplication of the first signal received by each of the plurality of receiving antennas by a weight.

6. The wireless communication system according to claim 2, wherein
    the relay apparatus is provided in a low orbit satellite, and
    the transmission apparatus, the receiving apparatus, and the at least one observation apparatus are installed on an earth.

7. The wireless communication system according to claim 6, wherein the operation is multiplication of the first signal received by each of the plurality of receiving antennas by a weight.

8. The wireless communication system according to claim 2, wherein the operation is multiplication of the first signal received by each of the plurality of receiving antennas by a weight.

9. The wireless communication system according to claim 1, wherein the operation is multiplication of the first signal received by each of the plurality of receiving antennas by a weight.

10. The wireless communication system according to claim 1, wherein the receiving apparatus is a different apparatus from the relay apparatus or the at least one observation apparatus.

11. The wireless communication system according to claim 1, wherein the at least one observation apparatus are at least three observation apparatuses, and the controller calculates the generation position of the interference signal by three-point positioning on a basis of the positions of the at least three observation apparatuses and the relationship between reception levels in the at least three observation apparatuses.

12. A control apparatus comprising:

a calculator that calculates a generation time and a generation position of an interference signal with respect to a first signal transmitted by a transmission apparatus on a basis of an observation result of a radio signal in at least one observation apparatus; and an instructor that receives a second signal indicating waveform data indicating a waveform of the first signal received from the transmission apparatus by each of a plurality of receiving antennas of a relay apparatus and a reception time of the first signal in the relay apparatus, performs reception processing of the received second signal to acquire the waveform data, and instructs a receiving apparatus that performs reception processing of the first signal indicated by the acquired waveform data to acquire data that is set to the first signal by the transmission apparatus to perform, in the reception processing, an operation of suppressing an interference signal arriving at the relay apparatus from the generation position at the generation time on the first signal at the reception time corresponding to the generation time.

13. A non-transitory computer-readable storage medium storing a program for causing a computer to function as the control apparatus according to claim 7.

14. A receiving apparatus comprising:

a signal receiver that receives a second signal indicating waveform data indicating a waveform of a first signal received from a transmission apparatus by each of a plurality of receiving antennas of a relay apparatus and a reception time of the first signal in the relay apparatus;

a second signal reception processor that performs reception processing of the second signal received by the signal receiver to acquire the waveform data;

a first signal reception processor that performs reception processing of the first signal indicated by the waveform data acquired by the second signal reception processor to acquire data that is set to the first signal by the transmission apparatus; and a controller that calculates a generation time and a generation position of an interference signal with respect to the first signal on a basis of an observation result of a radio signal in at least one observation apparatus, and instructs the first signal reception processor to perform, in the reception processing, an operation of suppressing an interference signal arriving at the relay apparatus from the generation position at the generation time on the first signal at the reception time corresponding to the generation time.

* * * * *